United States Patent
Monsere et al.

(10) Patent No.: US 8,634,994 B2
(45) Date of Patent: Jan. 21, 2014

(54) METHODS AND SYSTEMS FOR VEHICLE CONTROL DURING BRAKING OF THE VEHICLE

(75) Inventors: Patrick J. Monsere, Highland, MI (US); Eric E. Krueger, Chelsea, MI (US); Alexander K. Rustoni, Oxford, MI (US); Valarie V. Boatman, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 505 days.

(21) Appl. No.: 12/860,592

(22) Filed: Aug. 20, 2010

(65) Prior Publication Data
US 2012/0046840 A1    Feb. 23, 2012

(51) Int. Cl.
G06F 17/00    (2006.01)
B60K 28/10    (2006.01)

(52) U.S. Cl.
USPC ............................................ 701/51; 180/275

(58) Field of Classification Search
USPC ............. 701/1, 37, 36, 48, 71, 73, 51, 70, 78, 701/83, 82, 74, 90; 180/244, 370, 275, 276, 180/118, 119; 280/11.204–11.217, 28.11, 280/264; 477/21–29, 40, 92–94, 170–172, 477/182–211, 77, 79, 115
See application file for complete search history.

(56) References Cited

U.S. PATENT DOCUMENTS

| 6,490,518 B1 * | 12/2002 | Walenty et al. ................. 701/71 |
| 2006/0131951 A1 * | 6/2006 | Nakayama et al. .......... 303/9.64 |
| 2009/0137360 A1 * | 5/2009 | Shibata et al. .................... 477/3 |

FOREIGN PATENT DOCUMENTS

DE    3840564    * 3/1990

* cited by examiner

*Primary Examiner* — Muhammad Shafi
(74) *Attorney, Agent, or Firm* — Ingrassia Fisher & Lorenz, P.C.

(57) ABSTRACT

Methods and systems are provided for vehicle control during braking for vehicles having a transmission gear movable between at least a drive position and a neutral position. A wheel speed sensor measures a wheel speed of the wheel. A controller is coupled to the wheel speed sensor. The controller calculates a parameter using the wheel speed, and shifts the transmission gear from the drive position to the neutral position if the parameter exceeds a predetermined threshold. The parameter is indicative of a load on a component of the vehicle.

19 Claims, 6 Drawing Sheets

METHODS AND SYSTEMS FOR VEHICLE CONTROL DURING BRAKING OF THE VEHICLE

TECHNICAL FIELD

The present invention generally relates to the field of vehicles and, more specifically, to methods and systems for vehicle control during braking of the vehicle.

BACKGROUND OF THE INVENTION

To enhance an operator's driving experience and a vehicle's performance, various types of electronic enhancements and systems assist or replicate automotive systems that were previously mechanical in nature. One such automotive system is the brake-by-wire system. In a brake-by-wire system, an operator's activation of the brake pedal is determined by one or more sensors. Data from the sensors is then used by a computer or processor to determine an appropriate braking force to apply to the brakes.

Several different types of brake-by-wire systems exist. For example, in an electro-hydraulic braking system, the computer commands an electro-hydraulic actuator to apply hydraulic pressure to the brake calipers to stop the vehicle. In contrast, in an electro-mechanical braking system, the braking force is applied instead by an electronic caliper which utilizes a small motor to push the brake pads against the rotor to stop the vehicle. Also, hybrid cars can utilize a combination of friction braking, which can be electro-mechanical or electro-hydraulic, and regenerative braking, which is also a type of electronic braking in which speed is reduced by converting kinetic energy into electrical energy Regardless of the particular type of braking system used, braking systems generally utilize one or more driver-related inputs, such as a measure of brake pedal travel and/or a measure of brake pedal force, in determining a driver intended braking torque for the vehicle. However, a rapid application of brake torque by the driver may result in an anti-lock braking system (ABS) of the vehicle releasing significant amounts of brake torque, resulting in wheel recovery and larger than desirable loads on vehicle components, such as powertrain mounts. Such vehicle component loads may also occur if the vehicle is travelling on a rough surface, such as a gravel road, or a slick surface, such as an icy or wet road.

Accordingly, it is desirable to provide improved methods for controlling vehicle functions during braking so as to reduce loads on vehicle components, such as powertrain mounts, in certain conditions, for example if the driver intended braking torque is significant and/or the vehicle is travelling on a rough surface, such as a gravel road, or a slick surface, such as an icy or wet road. It is also desirable to provide improved systems for controlling vehicle functions during vehicle braking that reduces such vehicle component loads. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for vehicle control during braking of a vehicle having a transmission gear movable between at least a drive position and a neutral position is provided. The method comprises the steps of estimating a load on a vehicle component using a processor, and shifting the transmission gear from the drive position to the neutral position if the load is greater than a predetermined threshold.

In accordance with another exemplary embodiment, a method for controlling a vehicle during braking of the vehicle, the vehicle having a wheel and having a transmission gear movable between at least a drive position and a neutral position, is provided. The method comprises the steps of measuring a wheel speed of the wheel using a sensor, calculating a parameter using the wheel speed, and shifting the transmission gear from the drive position to the neutral position based on whether the parameter exceeds a predetermined threshold. The parameter is indicative of a load on a component of the vehicle.

In accordance with a further exemplary embodiment, a system for controlling braking of a vehicle having a wheel and having a transmission gear movable between at least a drive position and a neutral position is provided. The system comprises a wheel speed sensor and a controller. The wheel speed sensor is configured to measure a wheel speed of the wheel. The controller is coupled to the wheel speed sensor, and is configured to calculate a parameter using the wheel speed and shift the transmission gear from the drive position to the neutral position based on whether the parameter exceeds a predetermined threshold. The parameter is indicative of a load on a component of the vehicle.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
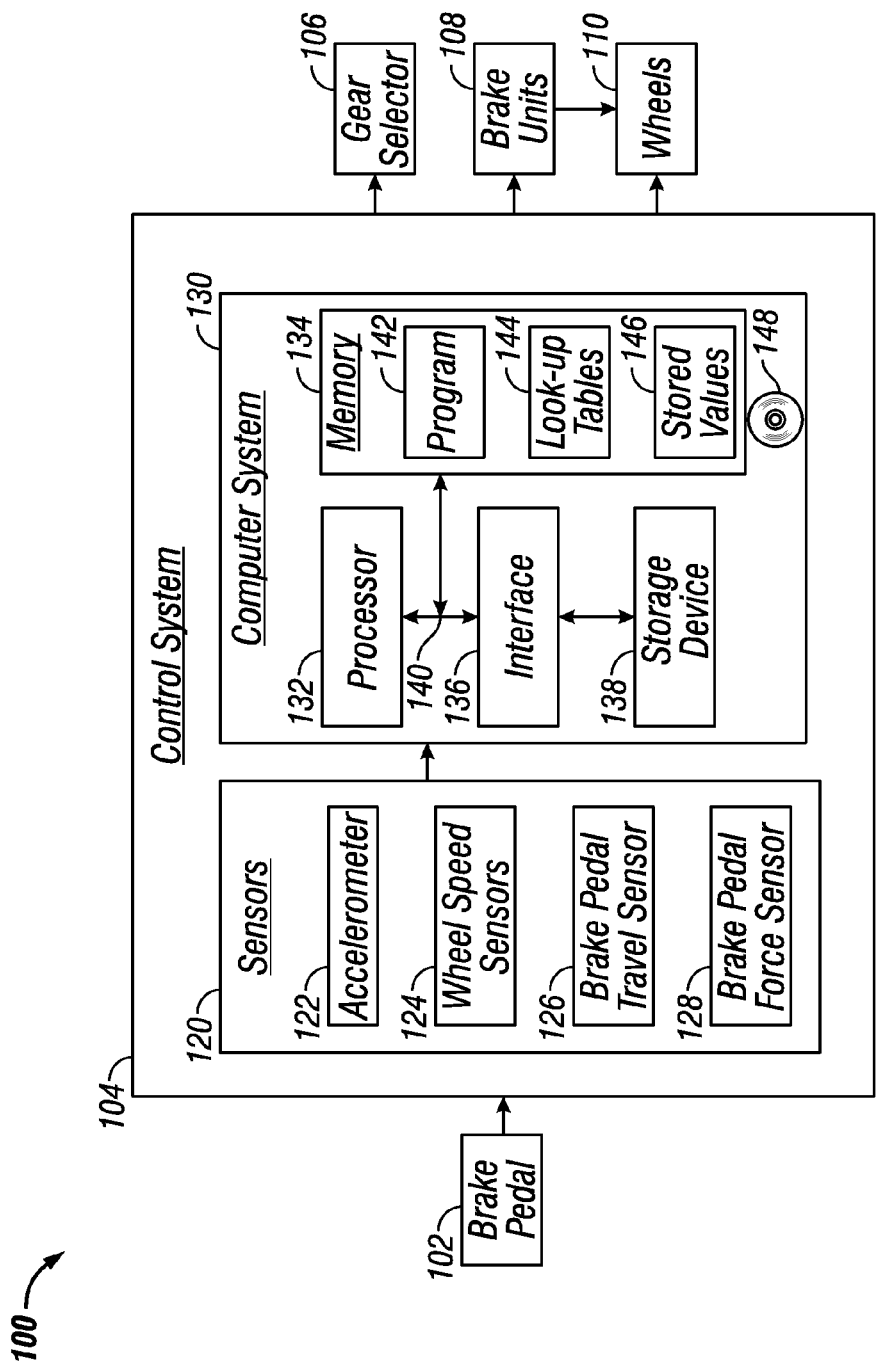
FIG. 1 is a functional block diagram of a control system for use in controlling a vehicle during braking of the vehicle, that can reduce loads on vehicle components, such as powertrain mounts, in accordance with an exemplary embodiment.

FIG. 1 is a block diagram of an exemplary braking system 100 for use in a brake-by-wire system. The braking system 100 includes a brake pedal 102, a control system 104, a transmission gear selection 106, a plurality of brake units 108, and a plurality of wheels 110.

The brake pedal 102 provides an interface between an operator of a vehicle and a braking system or a portion thereof, such as the braking system 100, which is used to slow or stop the vehicle. To initiate the braking system 100, an operator would typically use his or her foot to apply a force to the brake pedal 102 to move the brake pedal 102 in a generally downward direction. In one preferred embodiment the braking system 100 is an electro-hydraulic system.

The control system 104 helps to control certain vehicle actions (for example, by shifting a transmission gear of the vehicle and/or by adjusting a rate of application of braking pressure), in order to reduce loads on vehicle components, such as powertrain mounts. The control system 104 includes a plurality of sensors 120 and a computer system 130. The sensors 120 include an accelerometer 122, wheel speed sensors 124, a brake pedal travel sensor 126, and a brake pedal force sensor 128. Certain of the sensors 120 may vary, as may the number of such sensors 120.

The accelerometer 122 measures an acceleration of the vehicle. The accelerometer 122 is coupled to the computer system 130, and provides the measured vehicle acceleration thereto for processing. For example, in certain embodiments, the computer system 130 utilizes the vehicle acceleration obtained from the accelerometer 122 with a second measure of vehicle acceleration calculated independently from wheel speed values obtained from the wheel speed sensors 124 for use in controlling the vehicle during vehicle braking.

The wheel speed sensors 124 are coupled to the wheels 110. Preferably, each wheel speed sensor 124 is coupled to a different respective one of the wheels 110, and measures a wheel speed thereof. The wheel speed sensors 124 are also coupled to the computer system 130, and provide the measured wheel speeds thereto for processing. For example, in certain embodiments, the computer system 130 utilizes the vehicle speed values obtained from the wheel speed sensors 124 for use in calculating wheel slip values, estimating a measure of roughness of a road or surface on which the vehicle is travelling, calculating acceleration values of the wheels and/or for the vehicle (for example, as discussed above), and/or calculating other values for use in controlling the vehicle during vehicle braking. The number, placement, and coupling of the wheel speed sensors may vary in different embodiments. In addition, in certain embodiments, one or more other different types of sensors and/or other devices (such as, by way of example only, a global position system (GPS) device) may be used in measuring the vehicle speed and/or in providing information to the computer system 130 for use in calculating the vehicle speed and/or other parameter values.

The brake pedal travel sensor 126 is coupled to the brake pedal 102. The brake pedal travel sensor 126 provides an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved. Other methods of measuring brake travel can also be utilized. Regardless of the particular method utilized, the brake pedal travel sensor 126 is coupled to the computer system 130, and collects brake pedal travel data and provides the brake pedal travel data for use by the computer system 130 in controlling the vehicle during vehicle braking. It will be appreciated that multiple brake pedal travel sensors 126 may be used in various embodiments.

The brake pedal force sensor 128 is coupled to the brake pedal 102. The brake pedal force sensor 128 determines how much force the operator of braking system 100 is applying to the brake pedal 102, which is also known as brake pedal force. In one exemplary embodiment, the brake pedal force sensor 128 includes a hydraulic pressure emulator and/or a pressure transducer, and the brake pedal force can be determined by measuring hydraulic pressure in a master cylinder of the braking system 100. Regardless of the particular method utilized, the brake pedal force sensor 128 is coupled to the computer system 130, and collects brake pedal travel data and provides the brake pedal travel data for use by the computer system 130 in controlling the vehicle during vehicle braking. It will be appreciated that multiple brake pedal force sensors 128 may be used in various embodiments.

The computer system 130 comprises a controller that is coupled to the sensors 120, the transmission gear selection 106, and the brake units 108. The computer system 130 receives inputs from the various sensors 120 (including vehicle acceleration data from the accelerometer 122, wheel speed data from the wheel speed sensors 124, brake pedal travel data from the brake pedal travel sensor 126, and brake pedal force data from the brake pedal force sensor 128). As described in greater detail below, during vehicle braking, the computer system 130 uses values from these inputs, and calculations made therefrom, in exercising various types of vehicle control (such as altering the current transmission gear of operation of the vehicle, and adjusting a rate of application of braking pressure, when appropriate) via the transmission gear selection 106 and the brake units 108, for example in order to minimize loads on powertrain mounts and/or other vehicle components.

In the depicted embodiment, the computer system 130 includes a processor 132, a memory 134, an interface 136, a storage device 138, and a bus 140. The processor 132 performs the computation and control functions of the computer system 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the computer system 130.

The memory 134 can be any type of suitable memory. This would include the various types of dynamic random access memory (DRAM) such as SDRAM, the various types of static RAM (SRAM), and the various types of non-volatile memory (PROM, EPROM, and flash). The memory 134 stores the above-referenced programs 142 in addition to one or more look-up tables 144 and stored values 146 for use by the processor 132 in exercising vehicle control during braking of the vehicle. The memory is preferably co-located with the processor 132 on the same chip. The bus 140 serves to transmit programs, data, status and other information or signals between the various components of the computer system 130.

The interface 136 allows communication to the computer system 130, for example from a system driver and/or another computer system, and can be implemented using any suitable method and apparatus. It can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including direct access storage devices such as hard disk drives, flash systems, floppy disk drives and optical disk drives. In one exemplary embodiment, the storage device 138 comprises a program product from which memory 134 can receive a program 142 that executes one or more embodiments of one or more processes, such as the process 200 of FIG. 2, the process 300 of FIG. 3, and/or the process 400 of FIG. 4 (or portions thereof). In another exemplary embodiment, the program product may be directly stored in and/or otherwise accessed by the memory 134 and/or a disk (e.g., disk 148) such as that referenced below.

The bus 140 can be any suitable physical or logical means of connecting computer systems and components. This includes, but is not limited to, direct hard-wired connections, fiber optics, infrared and wireless bus technologies. During operation, the program 142 is stored in the memory 134 and executed by the processor 132. It will be appreciated that the computer system 130 may differ from the embodiment depicted in FIG. 1, for example in that the computer system 130 may be coupled to or may otherwise utilize one or more remote computer systems and/or other control systems.

It will be appreciated that while this exemplary embodiment is described in the context of a fully functioning computer system, those skilled in the art will recognize that the mechanisms are capable of being distributed as a program product in a variety of forms, and that the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 130 may also otherwise differ from the embodiment depicted in FIG. 1, for example in that the computer system 130 may be coupled to or may otherwise utilize one or more remote computer systems and/or other control systems.

The transmission gear selection 106 is coupled to the computer system 130. The transmission gear selection 106 receives instructions form the computer system 130 as to a desired transmission gear (e.g., drive, reverse, neutral, or park) for which the vehicle should be operating, and shifts into the desired transmission gear in accordance with the instructions received from the computer system 130.

The brake units 108 receive the brake commands from the control system 104 (specifically, from the computer system 130 thereof), and are controlled thereby accordingly. The brake units 108 can include any number of different types of devices that, upon receipt of brake commands, can apply the proper braking torque as received from the computer system 130. For example, in an electro-hydraulic system, the brake units 108 can comprise an actuator that can generate hydraulic pressure that can cause brake calipers to be applied to a brake disk to induce friction to stop a vehicle. Alternatively, in an electro-mechanical brake-by-wire system, the brake units 108 can comprise a wheel torque-generating device that operates as a vehicle brake. The brake units 108 can also be regenerative braking devices, in which case the brake units 108, when applied, at least facilitate conversion of kinetic energy into electrical energy.

Figure 2:
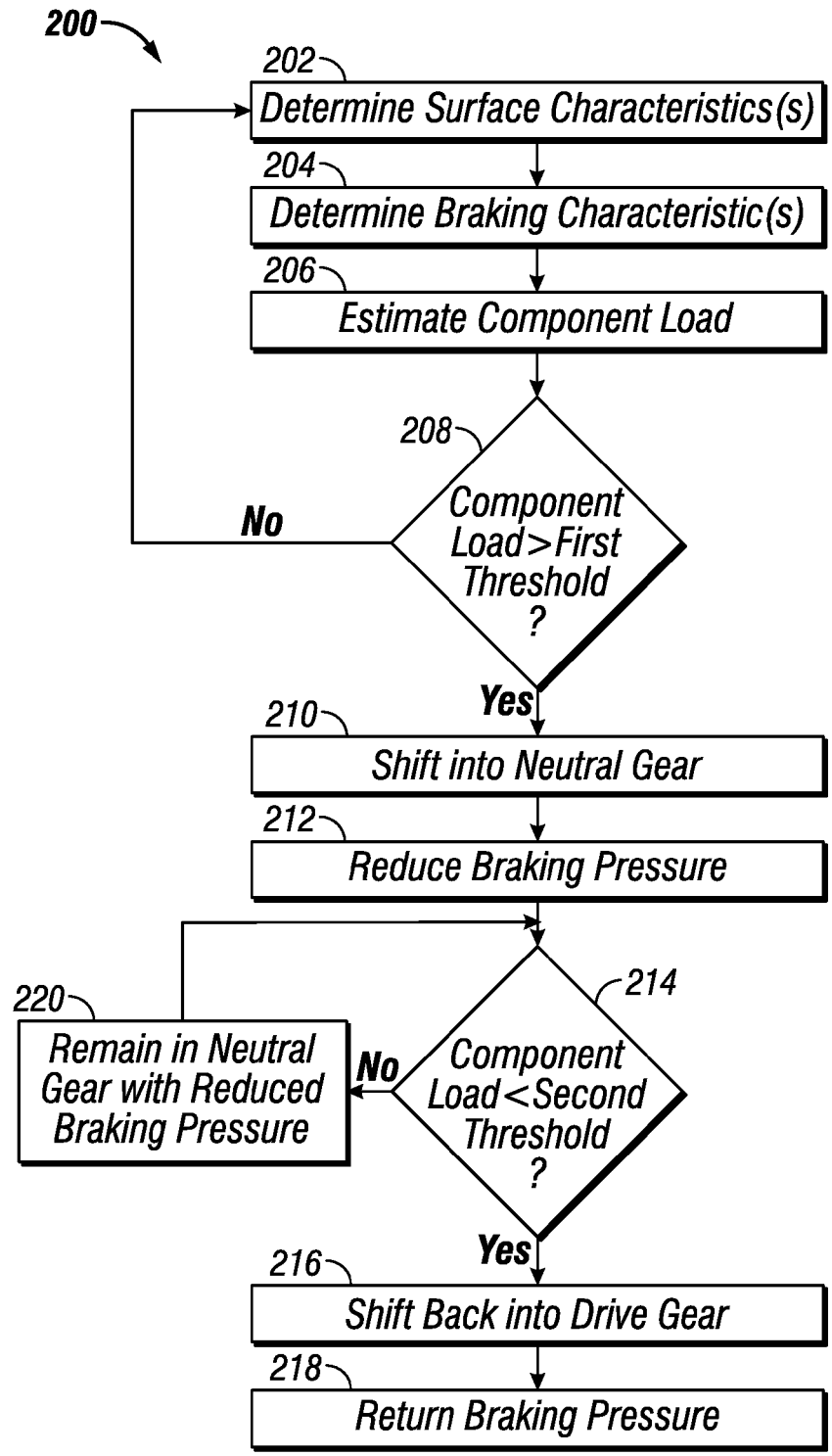
FIG. 2 is a flowchart of a process for controlling a vehicle during braking of the vehicle, that can reduce loads on vehicle components, such as powertrain mounts, and that can be utilized in connection with the control system of FIG. 1, in accordance with an exemplary embodiment.

FIG. 2 is a flowchart of a process 200 for controlling a vehicle during vehicle braking, in accordance with a first exemplary embodiment. The process 200 helps to control certain vehicle actions (such as by shifting a transmission gear of the vehicle and/or by adjusting a rate of application of braking pressure), for example in order to reduce loads on vehicle components, such as powertrain mounts. The process 200 can be implemented in connection with the braking system 100 and the control system 104 of FIG. 1.

As depicted in FIG. 2, the process 200 begins with the step of determining a characteristic of a road or other surface on which the vehicle is travelling (step 202). The characteristic of the surface preferably comprises a measure of roughness of the surface. For example, a gravel surface would be rougher than a dirt surface, and a dirt surface would be rougher than an asphalt surface, and so on. In certain examples, the characteristic of the surface pertains to how slippery the surface is and/or a coefficient of friction or a "Mu" rating for the surface, or the like. For example, an icy surface would have a slippery and/or a low-Mu characteristic. The characteristic of the surface is preferably determined indirectly using measured wheel speeds of one or more wheels of the vehicle, such as by using wheel slip values and/or measures of noise in wheel acceleration values calculated using the measured wheel speeds, for example using techniques described further below in connection with steps 302-308 of the process 300 of FIG. 3 and/or steps 402-412 of the process 400 of FIG. 4. The characteristic of the surface is preferably determined in step 202 by the processor 132 of FIG. 1 using data obtained via the accelerometer 122 and/or the wheel speed sensors 124 of FIG. 1.

In addition, a braking characteristic is determined for the vehicle (step 204). The braking characteristic preferably comprises a measure of driver intended braking torque based on a driver's engagement of a brake pedal of the vehicle, such as the brake pedal 102 of FIG. 1, for example based on a measure of movement of the brake pedal (brake pedal travel) and/or a measure of force applied to the brake pedal (brake pedal force). The braking characteristic is preferably determined in step 204 by the processor 132 of FIG. 1 using data from the brake pedal travel sensor 126 and the brake pedal force sensor 128 of FIG. 1.

A component load is estimated (step 206). Preferably, the component load comprises a load on a component of the vehicle, most preferably a powertrain mount of the vehicle. The component load is estimated using the surface characteristic of step 202 and the braking characteristic of step 204. In certain examples, the component load may be estimated or calculated directly. In certain other examples, one or more other variables (such as the surface characteristic and/or the braking characteristic) may be used indirectly as a proxy for the component load during vehicle braking. The component load is preferably calculated by the processor 132 of FIG. 1. Steps 202-206 are preferably performed repeatedly, most preferably continuously, throughout the process 200.

A determination is then made as to whether the component load is greater than a first predetermined threshold (step 208). The first predetermined threshold preferably represents an amount of load on the vehicle component at which an undesirable amount of wear or risk of damage may occur with respect to the vehicle component during vehicle braking. This determination is preferably calculated by the processor 132 of FIG. 1.

If it is determined in step 208 that the component load is less than or equal to the first predetermined threshold, then the process returns to step 202, as the surface characteristic continues to be determined. Steps 202-208 repeat until there is a determination in a subsequent iteration of step 208 that the component load is greater than the first predetermined threshold.

Once it is determined in an iteration of step 208 that the component load is greater than the first predetermined threshold, the transmission gear is shifted from the drive position to the neutral position (step 210). This shift in the transmission gear helps to alleviate the load on the vehicle component, preferably the powertrain mount. This shift in the transmission gear is preferably initiated by the computer system 130 or controller of FIG. 1 (most preferably by the processor 132 thereof) by instructions provided thereto to the transmission gear selection 106, which are then implemented by the transmission gear selection 106.

In certain embodiments, a rate of application of braking pressure is also reduced (step 212) after it is determined that the component load is greater than the first predetermined threshold. Preferably, during step 212, the rate of application of the braking pressure is reduced below the driver intended braking torque, so as to further reduce the load on the vehicle component, such as the powertrain mount. In one example, the rate of application of the braking pressure is reduced for a short period of time (such as a few milliseconds) in order to provide the transmission time to shift, and is then automatically returned to its prior value. Preferably the computer system 130 or controller of FIG. 1 (most preferably the processor 132 thereof) reduces the rate of application of the braking pressure supplied to the brake units 108 of FIG. 1 during step 212. As described further below in connection with the process 300 of FIG. 3 and the process 400 of FIG. 4, in certain embodiments the rate of apply of braking pressure may not be reduced, and/or may be reduced only upon the occurrence of one or more other conditions, for example that a panic braking event is not occurring for the vehicle.

After a predetermined amount of time (preferably, two or three seconds), a subsequent determination is made as to whether the component load is less than a second predetermined threshold (step 214). Preferably, the determination of step 208 is made at a first point in time, and the determination of step 214 is made at a second point in time that is subsequent to the first point of time. The second predetermined threshold preferably represents an amount of load on the vehicle component at which an undesirable amount of wear or risk of damage is unlikely with respect to the vehicle component during vehicle braking. This determination is preferably made by the processor 132 of FIG. 1. Most preferably, the second predetermined threshold of step 214 is equal to the first predetermined threshold of step 208. However, this may vary in other embodiments.

If a determination is made in step 214 that the component load is less than the second predetermined threshold, the transmission gear is shifted back from the neutral position to the drive position (step 216). This shift in the transmission gear is preferably initiated by the computer system 130 or controller of FIG. 1 (most preferably by the processor 132 thereof) by instructions provided thereto to the transmission gear selection 106, which are then implemented by the transmission gear selection 106.

In addition, to the extent that the rate of application of the braking pressure has been reduced in step 212 and has not yet returned to its prior level, the rate of application of the braking pressure is now returned to the rate of application of the braking pressure that existed before the reduction of step 212 (step 218). Specifically, during step 218, the rate of application of the braking pressure is preferably increased so as to equal the driver intended braking torque desired by the driver. Preferably, the computer system 130 or controller of FIG. 1 (most preferably the processor 132 thereof) adjusts the rate of application of the braking pressure supplied to the brake units 108 of FIG. 1 during step 218.

Conversely, if it is determined in step 214 that the component load is greater than or equal to the second predetermined threshold, then a determination is then made as to whether the component load is less than a third predetermined threshold (step 220). Preferably, the determination of step 208 is made at a first point in time, and the determination of step 220 is made at a second point in time that is subsequent to the first point of time. The third predetermined threshold preferably represents an amount of load on the vehicle component at which an undesirable amount of wear or risk of damage is unlikely with respect to the vehicle component during vehicle braking. This determination is preferably calculated by the processor 132 of FIG. 1. Most preferably, the third predetermined threshold of step 220 is equal to the first predetermined threshold of step 208. However, this may vary in other embodiments.

If it is determined in step 220 that the component load is less than the third predetermined threshold, then the process proceeds to the above-referenced step 216, as the transmission gear is shifted back from the neutral position to the drive position. This shift in the transmission gear is preferably initiated by the computer system 130 or controller of FIG. 1 (most preferably by the processor 132 thereof) by instructions provided thereto to the transmission gear selection 106, which are then implemented by the transmission gear selection 106. The process then proceeds further to step 218, also described above.

Conversely, if it is determined in step 220 that the component load is greater than or equal to the third predetermined threshold, then a determination is made as to whether the brake pedal is released by the driver (step 222). This determination is preferably made by the processor 132 of FIG. 1 based on brake pedal travel data from the brake pedal travel sensor 126 and/or the brake pedal force sensor 128 of FIG. 1.

If it is determined that the brake pedal is released, the process proceeds to the above-referenced step 216, and the transmission gear is shifted back from the neutral position to the drive position. The process then proceeds further to step 218, also described above.

Conversely, if it is determined that the brake pedal is not released, then a determination is made as to whether an accelerator pedal is engaged (step 224). This determination is preferably made by the processor 132 of FIG. 1 based on accelerator pedal engagement data provided by an accelerator pedal sensor (not depicted in FIG. 1).

If it is determined that the accelerator pedal is engaged, the process proceeds to the above-referenced step 216, and the transmission gear is shifted back from the neutral position to the drive position. The process then proceeds further to step 218, also described above.

Conversely, if it is determined that the accelerator pedal is not engaged, the process proceeds instead to step 226, as the transmission gear remains in neutral (step 226). Also during step 226, in certain examples the rate of application of the braking pressure remains reduced, to the extent that the rate of application of the braking pressure was reduced during step 212. Preferably, the process remains in step 226 until such a point in time in which at least one of the conditions of steps 214, 220, 222, and/or 224, at which point the transmission gear is switched back into drive pursuant to step 216, and the process further proceeds to step 218, described above.

Figure 3:
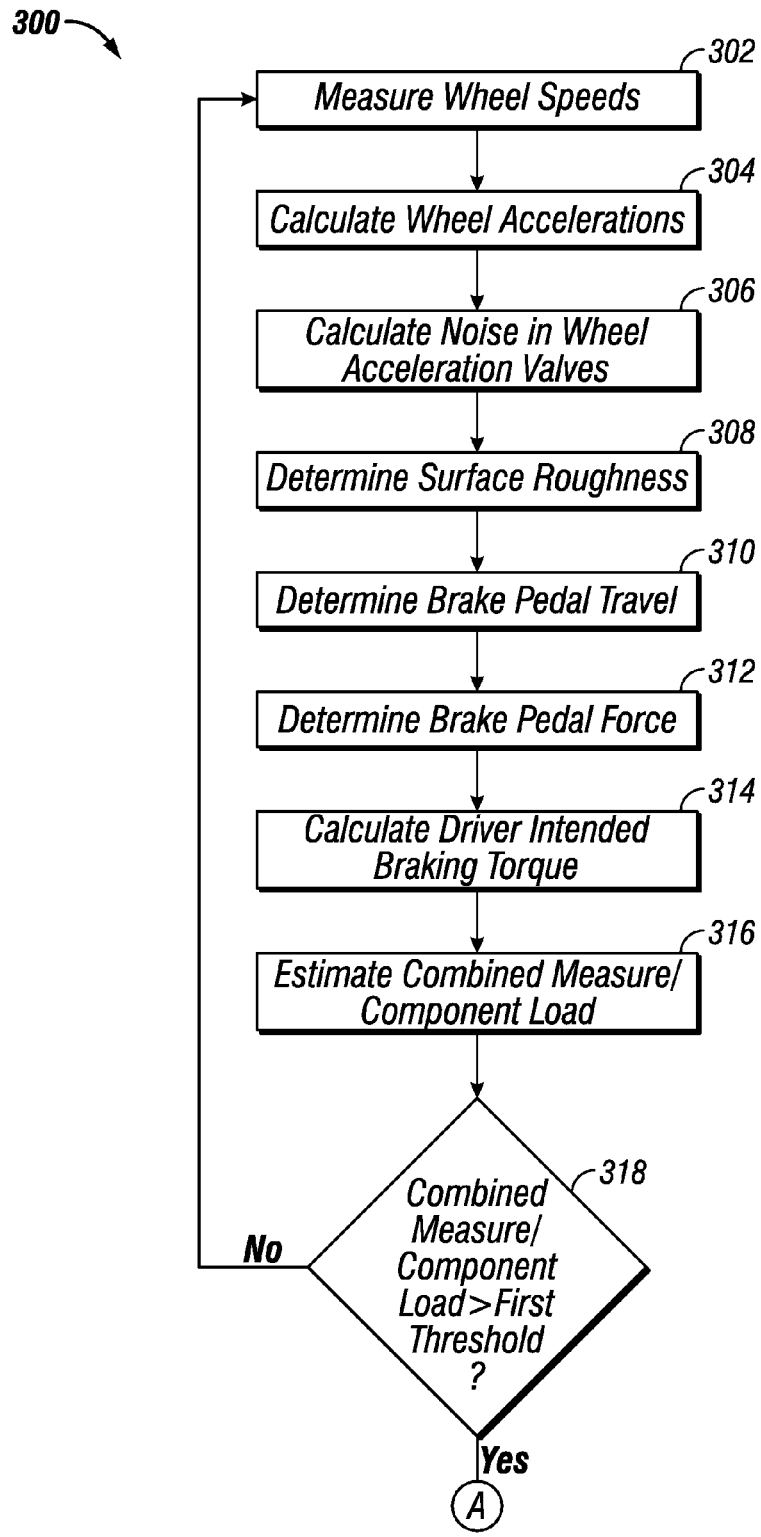
FIG. 3 is a flowchart of a process for controlling a vehicle during braking of the vehicle, that can reduce loads on vehicle components, such as powertrain mounts, and that can be utilized in connection with the control system of FIG. 1, in accordance with another exemplary embodiment.
Figure 3:
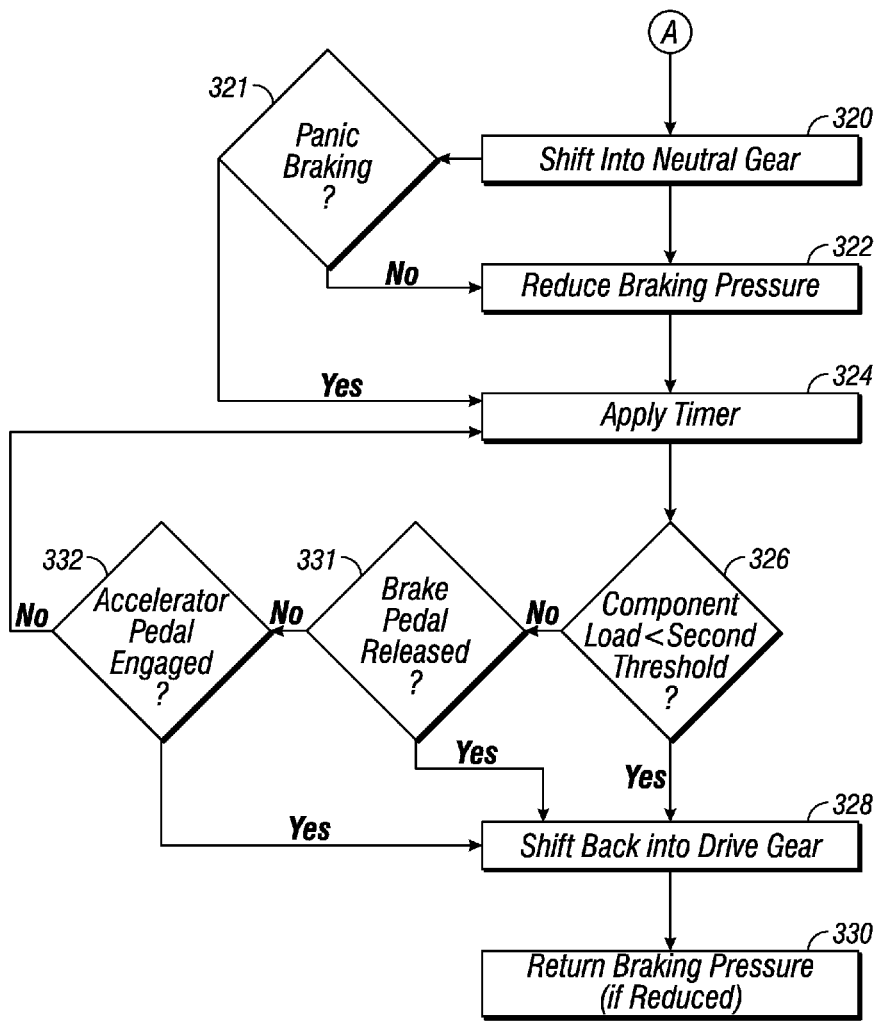

FIG. 3 is a flowchart of a process 300 for controlling a vehicle during vehicle braking, in accordance with a second exemplary embodiment. The process 300 can be implemented in connection with the braking system 100 and the control system 104 of FIG. 1.

As depicted in FIG. 3, the process 300 begins with the step of measuring one or more wheel speeds (step 302). The wheel speeds are preferably measured by the wheel speed sensors 124 of FIG. 1 with respect to the wheels 110 of FIG. 1 and provided to the processor 132 of FIG. 1 for processing. The wheel speeds are taken at various points in time and used to calculate wheel accelerations (step 304), preferably by the processor 132 of FIG. 1.

A noise is then calculated with respect to the wheel acceleration values (step 306). The noise preferably represents a measure of inconsistency or abnormal fluctuation (or other noise) in the magnitude of the wheel acceleration values of step 304. The noise is preferably calculated by the processor 132 of FIG. 1.

The noise is then used to determine a measure of roughness of the road or other surface on which the vehicle is driving (step 308). For example, if the vehicle is travelling on a gravel or otherwise rough road, the noise in the magnitude of the wheel acceleration values would generally be larger as compared with values for when the vehicle was travelling on a smooth road of asphalt.

In addition, brake pedal travel is determined (step 310). The brake pedal travel is determined based on movement of the brake pedal during operation of the vehicle. The brake pedal travel may be measured by the brake pedal travel sensor 126 of FIG. 1 based on detected movement of the brake pedal 102 of FIG. 1 and provided to the processor 132 of the computer system 130 of FIG. 1 for processing. Alternatively, the brake pedal travel may be calculated by the processor 132 of the computer system 130 of FIG. 1 based on information provided by the brake pedal travel sensor 126 of FIG. 1.

Brake pedal force is also determined (step 312). The brake pedal force is determined based on a force applied to the brake pedal during operation of the vehicle. The brake pedal force may be measured by the brake pedal force sensor 128 of FIG. 1 based on a detected force applied to the brake pedal 102 of FIG. 1, and the measurements are provided to the processor 132 of the computer system 130 of FIG. 1 for processing. Alternatively, the brake pedal force may be calculated by the processor 132 of the computer system 130 of FIG. 1 based on information provided by the brake pedal force sensor 128 of FIG. 1.

A driver intended braking torque is then calculated (step 314). The driver intended braking torque comprises a level of braking or a rate of deceleration of the vehicle corresponding to the driver inputs to the brake pedal 102, thereby approximating the intent of the driver. The driver intended braking torque is preferably calculated using the brake pedal travel information of step 310 and the brake pedal force information of step 312. In certain embodiments, brake pedal travel may be used without brake pedal force, or vice versa. Similarly, in certain embodiments, step 310 or 312 may not be necessary. The driver intended braking torque is preferably calculated by the processor 132 of the computer system 130 of FIG. 1.

A combined measure and/or component load is estimated (step 316). In one example, the combined measure comprises the component load described above in connection with step 206 of the process 200 of FIG. 2. In another example, the combined measure comprises one or more values that serve as a proxy for the load on such a vehicle component, such as a powertrain mount, during vehicle braking. Preferably, the combined measure comprises a combination of the surface roughness of step 208 and the driver intended braking torque of step 314. Steps 302-316 are preferably performed repeatedly, most preferably continuously, throughout the process 300.

A determination is then made as to whether the combined measure or component load of step 316 is greater than a first predetermined threshold (step 318). The first predetermined threshold preferably represents an amount of load on the vehicle component at which an undesirable amount of wear or risk of damage may occur with respect to the vehicle component during vehicle braking. This determination is preferably calculated by the processor 132 of FIG. 1 using a look-up table 144 of FIG. 1 stored in the memory 134 of FIG. 1. In one example, the more rough the surface is on which the vehicle is moving, a smaller measure of driver intended braking torque would be needed in order to exceed the first predetermined threshold. Similarly, the greater the driver intended braking torque, a smaller (or less rough) measure of surface roughness would be needed in order to exceed the first predetermined threshold. In one example, the load on a powertrain mount may be caused at least in part based on how an anti-lock braking system (ABS) of the vehicle is actuated. Consequently, the load on the powertrain mount may be more significant on a rough driving surface as compared with a smooth driving surface.

If it is determined in step 318 that the combined measure or component load is less than or equal to the first predetermined threshold, then the process returns to step 302, as the wheel speeds continue to be determined. Steps 302-318 repeat until there is a determination in a subsequent iteration of step 318 that the combined measure or component load is greater than the first predetermined threshold.

Once it is determined in an iteration of step 318 that the component load is greater than the first predetermined threshold, the transmission gear is shifted from the drive position to the neutral position (step 320). This shift in the transmission gear helps to alleviate the load on the vehicle component, such as the powertrain mount. This shift in the transmission gear is preferably initiated by the computer system 130 or controller of FIG. 1 (most preferably by the processor 132 thereof) by instructions provided thereto to the transmission gear selection 106, which are then implemented by the transmission gear selection 106.

A determination is also made as to whether the vehicle is experiencing a panic braking event (step 321). Preferably, the determination of step 321 comprises a determination as to whether the driver intended braking torque of step 314 is greater than a braking threshold that would indicate that the driver has initiated a panic braking maneuver. This determination is preferably made by the processor 132 of FIG. 1.

If it is determined that the vehicle is experiencing a panic braking event, then the process proceeds to step 324, described further below. Conversely, if it is determined that the vehicle is not experiencing a panic braking event, then the rate of application of the braking pressure is reduced below the driver intended braking torque (step 322), so as to further reduce the load on the vehicle component, such as the powertrain mount. In one example, the rate of application of the braking pressure is reduced for a short period of time (such as a few milliseconds) in order to provide the transmission time to shift, and is then automatically returned to its prior value. Preferably the computer system 130 or controller of FIG. 1 (most preferably the processor 132 thereof) reduces the rate of application of the braking pressure supplied to the brake units 108 of FIG. 1 during step 322. Following step 322, the process proceeds to step 324, described directly below.

A timer is then applied (step 324). The timer serves as one criterion that may cause the transmission to be shifted back to the drive position. Specifically, if the timer expires without the trigger of step 318 occurring again, then the transmission is shifted back to the drive position. The timer preferably lasts for approximately two or three seconds. However, this may vary.

A subsequent determination is then made as to whether the combined measure or component load is less than a second predetermined threshold (step 326). Preferably, the determination of step 318 is made at a first point in time, and the determination of step 326 is made at a second point in time that is subsequent to the first point of time. The second predetermined threshold preferably represents an amount of load on the vehicle component at which an undesirable amount of wear or risk of damage is unlikely with respect to the vehicle component during vehicle braking. This determination is preferably calculated by the processor 132 of FIG. 1. Most preferably, the second predetermined threshold of step 326 is equal to the first predetermined threshold of step 318. However, this may vary in other embodiments.

If it is determined in step 326 that the combined measure or component load is less than the second predetermined threshold, then the transmission gear is shifted back from the neutral position to the drive position (step 328). This shift in the transmission gear is preferably initiated by the computer system 130 or controller of FIG. 1 (most preferably by the processor 132 thereof) by instructions provided thereto to the transmission gear selection 106, which are then implemented by the transmission gear selection 106.

In addition, to the extent that the rate of application of the braking pressure has been reduced in step 322 and has not yet returned to its prior level, the rate of application of the braking pressure is now returned to the rate that existed before the reduction of step 322 (step 330). Specifically, during step 330, the rate of application of the braking pressure is preferably increased so as to equal the driver intended braking torque desired by the driver. Preferably, the computer system 130 or controller of FIG. 1 (most preferably the processor 132 thereof) adjusts the rate of application of the braking pressure supplied to the brake units 108 of FIG. 1 during step 330.

Conversely, if it is determined in step 326 that the combined measure or component load is greater than or equal to the second predetermined threshold, then a determination is made as to whether the brake pedal is released by the driver (step 331). This determination is preferably made by the processor 132 of FIG. 1 based on brake pedal travel data from the brake pedal travel sensor 126 and/or the brake pedal force sensor 128 of FIG. 1, If it is determined that the brake pedal is released, the process proceeds to the above-referenced step 328, and the transmission gear is shifted back from the neutral position to the drive position. In addition, to the extent that the rate of application of the braking pressure has been reduced in step 322 and has not yet increased to its prior level, the process also proceeds to the above-referenced step 330, in which the rate of application of the braking pressure is now returned to the rate that existed before the reduction of step 322.

Conversely, if it is determined that the brake pedal is not released, then a determination is made as to whether an accelerator pedal is engaged (step 332). This determination is preferably made by the processor 132 of FIG. 1 based on accelerator pedal engagement data provided by an accelerator pedal sensor (not depicted in FIG. 1).

If it is determined that the accelerator pedal is engaged, the process proceeds to the above-referenced step 328, and the transmission gear is shifted back from the neutral position to the drive position. In addition, to the extent that the rate of application of the braking pressure has been reduced in step 322 and has not yet returned to its prior level, the process also proceeds to the above-referenced step 330, in which the rate of application of the braking pressure is now returned to the rate that existed before the reduction of step 322. Conversely, if it is determined that the accelerator pedal is not engaged, the process proceed instead to the above-referenced timer of step 324, and steps 324-332 repeat until at least one of the conditions of steps 326, 330, and/or 332 are satisfied and the transmission gear is switched back into drive pursuant to step 328.

Figure 4:
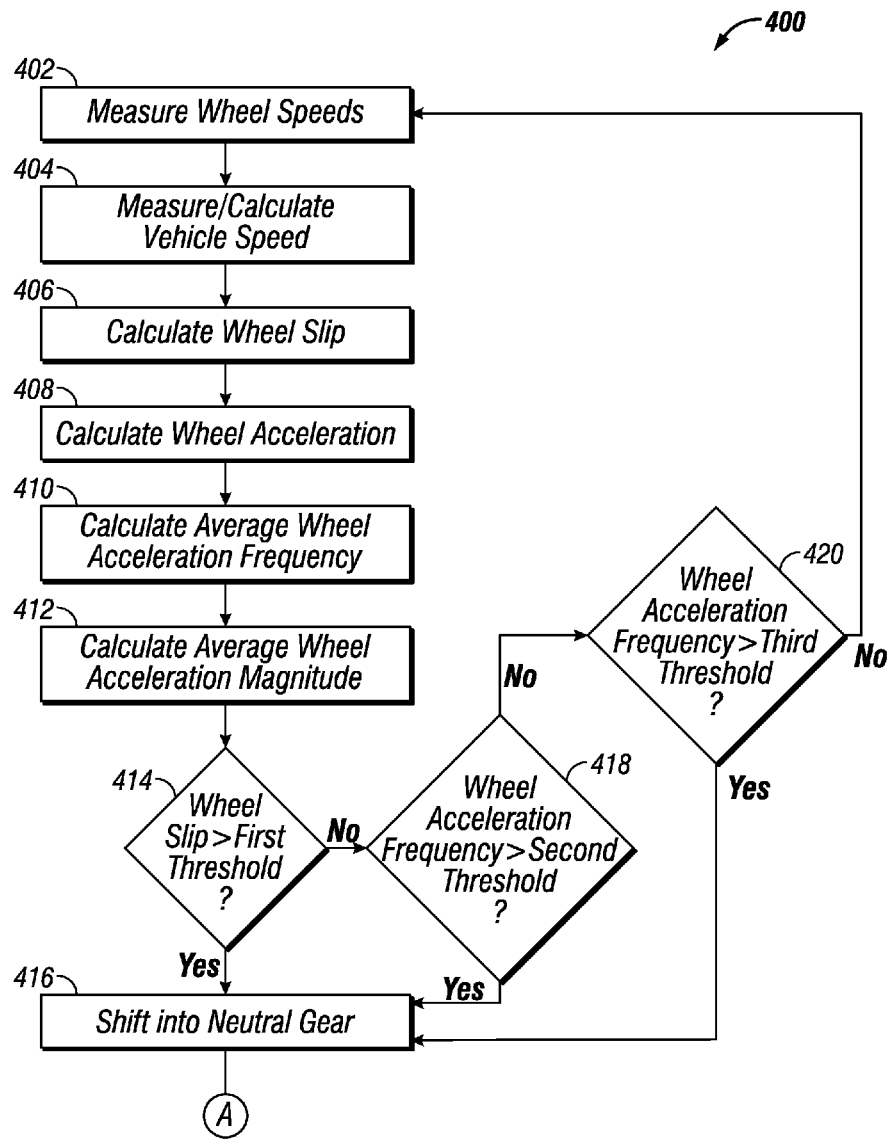
FIG. 4 is a flowchart of a process for controlling a vehicle during braking of the vehicle, that can reduce loads on vehicle components, such as powertrain mounts, and that can be utilized in connection with the control system of FIG. 1, in accordance with a further exemplary embodiment.
Figure 4:
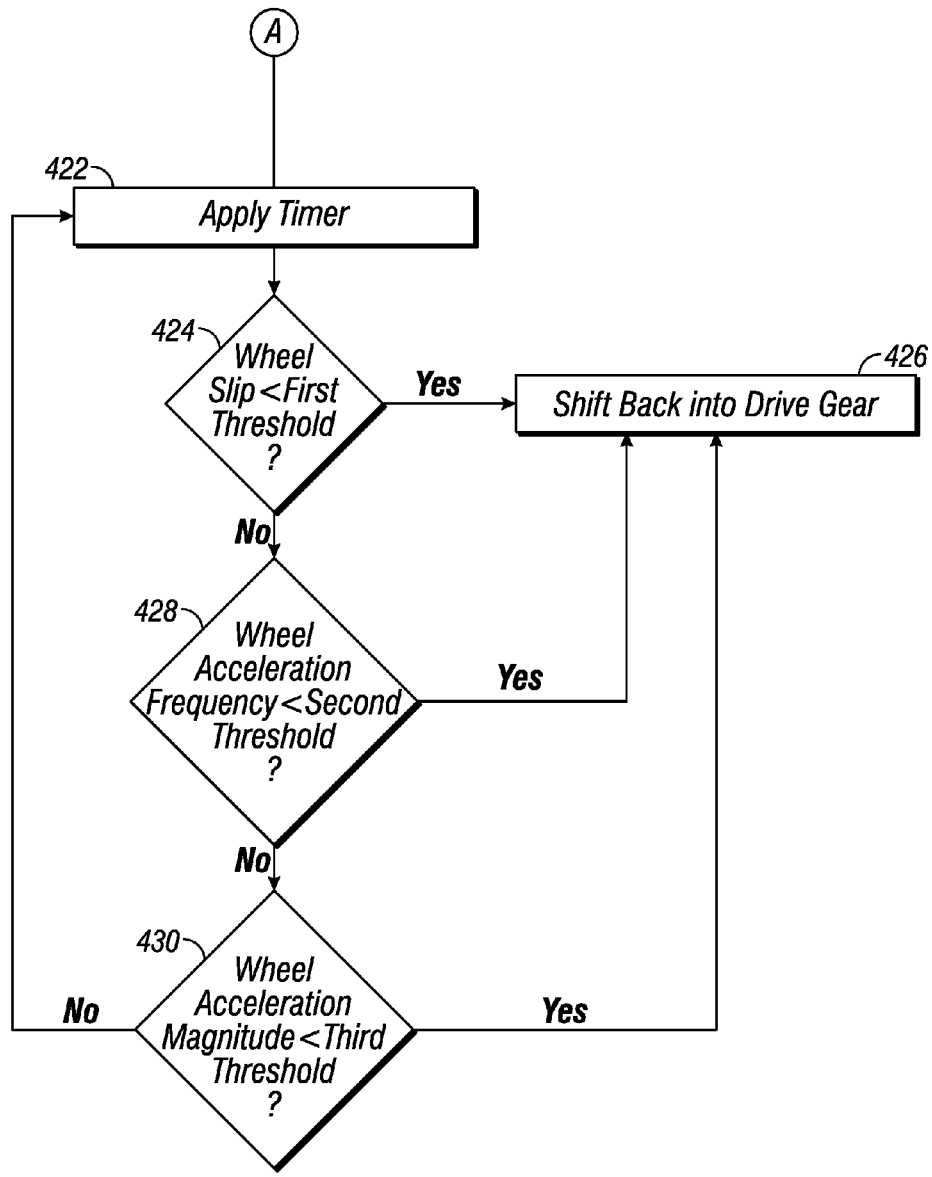

FIG. 4 is a flowchart of a process 400 for controlling a vehicle during vehicle braking, in accordance with a third exemplary embodiment. The process 400 can be implemented in connection with the braking system 100 and the control system 104 of FIG. 1.

As depicted in FIG. 4, the process 400 begins with the step of measuring one or more wheel speeds (step 402). The wheel speeds are preferably measured by the wheel speed sensors 124 of FIG. 1 with respect to the wheels 110 of FIG. 1 and provided to the processor 132 of FIG. 1 for processing. The wheel speeds are taken at various points in time and used to calculate wheel accelerations (step 408), preferably by the processor 132 of FIG. 1.

A vehicle speed is also calculated (step 404). The vehicle speed is preferably calculated independently of the wheel speeds of step 402. Most preferably, the vehicle speed is calculated by the processor 132 of FIG. 1 using vehicle acceleration data obtained from the accelerometer 122 of FIG. 1.

In addition, one or more wheel slip values are calculated (step 406). Preferably, wheel slip values are calculated for each of the wheels 110 of FIG. 1 by the processor 132 of FIG. 1 using the wheel speeds of step 402 and the vehicle speed of step 404 by subtracting the wheel speeds from the vehicle speed and then dividing this difference by the vehicle speed. Wheel acceleration values are also calculated (step 408). Preferably, wheel acceleration values are calculated for each of the wheels 110 of FIG. 1 by the processor 132 of FIG. 1 using the wheel speeds of step 402 over various points in time. An average wheel acceleration frequency (step 410) and an average wheel acceleration magnitude (step 412) are then calculated among the wheels using the wheel acceleration values of step 408, preferably by the processor 132 of FIG. 1. The wheel slip values and wheel acceleration magnitude and frequency values serve as a proxy for a load on one or more vehicle components, such as powertrain mounts, during braking of the vehicle. The calculations of steps 402-412 are repeated, preferably continuously, throughout the process 400.

A determination is then made as to whether the wheel slip is greater than a first predetermined threshold (step 414). The first predetermined threshold preferably represents an amount of wheel slip that is likely to represent and/or cause an undesirable amount of wear or risk of damage with respect to the vehicle component during vehicle braking. This determination is preferably calculated by the processor 132 of FIG. 1 using a look-up table 144 of FIG. 1 stored in the memory 134 of FIG. 1.

If it is determined in step 414 that the wheel slip of step 406 is greater than the first predetermined threshold, then the transmission gear is shifted from the drive position to the neutral position (step 416). This shift in the transmission gear helps to alleviate the load on the vehicle component, such as the powertrain mount. This shift in the transmission gear is preferably initiated by the computer system 130 or controller of FIG. 1 (most preferably by the processor 132 thereof) by instructions provided thereto to the transmission gear selection 106, which are then implemented by the transmission gear selection 106.

Conversely, if a determination is made that the wheel slip is less than or equal to the first predetermined threshold, a determination is made as to whether the average wheel acceleration frequency of step 410 is less than a second predetermined threshold (step 418). The second predetermined threshold preferably represents an amount of wheel acceleration frequency below which is likely to represent and/or cause an undesirable amount of wear or risk of damage with respect to the vehicle component during vehicle braking. This determination is preferably calculated by the processor 132 of FIG. 1 using a look-up table 144 of FIG. 1 stored in the memory 134 of FIG. 1.

If it is determined in step 418 that the average wheel acceleration frequency is greater than or equal to the second predetermined threshold, then the process returns to step 402, as wheel speeds are measured again at a new point in time, and steps 402-420 are conducted in various iterations as necessary until the combined conditions of steps 414, 418, and 420 are satisfied and the transmission gear is shifted in neutral in step 416.

Conversely, if it is determined in step 418 that the average wheel acceleration frequency is less than the second predetermined threshold, then a determination is made as to whether the average wheel acceleration magnitude of step 412 is greater than a third predetermined threshold (step 420). The third predetermined threshold preferably represents an amount of wheel acceleration magnitude that is likely to represent and/or cause an undesirable amount of wear or risk of damage with respect to the vehicle component during vehicle braking. This determination is preferably calculated by the processor 132 of FIG. 1 using a look-up table 144 of FIG. 1 stored in the memory 134 of FIG. 1.

If it is determined in step 420 that the average wheel acceleration magnitude is greater than the third predetermined threshold, then the process proceeds to the above-referenced step 416, and the transmission gear is shifted from the drive position to the neutral position. Conversely, if it is determined in step 420 that the average wheel acceleration magnitude is less than or equal to the third predetermined threshold, then the process returns to step 402, as wheel speeds are measured again at a new point in time, and steps 402-420 repeat until the combined conditions of steps 414, 418, and 420 are satisfied and the transmission gear is shifted in neutral in step 416.

After the transmission gear is shifted to neutral in step 416, a timer is applied (step 422). The timer serves as one criterion that may cause the transmission to be shifted back to the drive position. Specifically, if the timer expires without any of the triggers 414, 418, or 420 occurring again, then the transmission is shifted back to the drive position. The timer preferably lasts for approximately two or three seconds. However, this may vary.

A subsequent determination is then made as to whether the wheel slip is less than the first predetermined threshold (step 424). Preferably, the determination of step 414 is made at a first point in time, and the determination of step 424 is made at a second point in time that is subsequent to the first point of time. This determination is preferably calculated by the processor 132 of FIG. 1.

If it is determined in step 424 that the wheel slip is less than the first predetermined threshold, then the transmission gear is shifted back from the neutral position to the drive position (step 426). This shift in the transmission gear is preferably initiated by the computer system 130 or controller of FIG. 1 (most preferably by the processor 132 thereof) by instructions provided thereto to the transmission gear selection 106, which are then implemented by the transmission gear selection 106.

Conversely, if it is determined in step 424 that the wheel slip is greater than or equal to the first predetermined threshold, then a determination is made as to whether the average wheel acceleration frequency is less than the second predetermined threshold (step 428). If it is determined in step 428 that the average wheel acceleration frequency is less than the second predetermined threshold, then the proceeds to the above referenced step 426, and the transmission gear is shifted back from the neutral position to the drive position.

If it is instead determined in step 426 that the average wheel acceleration frequency is greater than or equal to the second predetermined threshold, then a determination is made as to whether the average wheel acceleration magnitude is less than the third predetermined threshold (step 430). If it is determined in step 428 that the average wheel acceleration magnitude is less than the third predetermined threshold, then the proceeds to the above referenced step 426, and the transmission gear is shifted back from the neutral position to the drive position. Otherwise, the process returns to step 422, as the timer is applied again, and steps 422-430 repeat until at least one of the conditions of steps 424, 428, and/or 430 are satisfied and the transmission gear is shifting back into the driver gear in step 426.

Accordingly, improved methods and systems are provided for controlling vehicle actions during a braking event. The disclosed methods and systems result in a shift of the transmission gear to a neutral position in situations in which one or more vehicle components, such as powertrain mounts, are likely to otherwise experience greater than desirable loads. In certain embodiments, the rate of application of the braking pressure may also be reduced under such conditions. This provides for decreased loads on such vehicle components, and therefore can result in decreased wear and/or an increased life expectancy and/or effectiveness of such vehicle components. In addition, this also limits unwanted noise and vibration experienced by occupants of the vehicle.

It will be appreciated that the disclosed methods and systems may vary from those depicted in the Figures and described herein. For example, various components of the braking system 100 and/or the control system 104 may vary from those depicted in FIG. 1 and/or described above. Similarly, various steps of the processes 200, 300, and 400 of FIGS. 2, 3, and 4, respectively, may differ from and/or be performed simultaneously and/or in a different order than depicted in FIGS. 2-4 and/or described above. It will similarly be appreciated that the disclosed method and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for vehicle control during braking of a vehicle having a transmission gear movable between at least a drive position and a neutral position, the method comprising the steps of:

estimating a load on a vehicle component at a first time using a processor; and shifting the transmission gear from the drive position to the neutral position if the load is greater than a predetermined threshold; estimating the load on the vehicle component at a second time, the second time being subsequent to the first time; and shifting the transmission gear back to the drive position if the load is less than a second predetermined threshold at the second time.

2. The method of claim 1, wherein the vehicle includes a brake unit, and the method further comprises the step of:

reducing a rate of an application of a braking pressure provided to the brake unit if the load is greater than the predetermined threshold.

3. The method of claim 2, wherein the method further comprises the steps of:
reducing the rate of the application of the braking pressure provided to the brake unit if the load is less than the second predetermined threshold at the second time.

4. The method of claim 1, wherein the vehicle component comprises a powertrain mount.

5. A method for vehicle control during braking of a vehicle having a wheel and having a transmission gear movable between at least a drive position and a neutral position, the method comprising the steps of:
measuring a wheel speed of the wheel using a sensor;
calculating a parameter using the wheel speed, the parameter being indicative of a load on a component of the vehicle at a first time;
shifting the transmission gear from the drive position to the neutral position based on whether the parameter exceeds a predetermined threshold;
calculating the parameter using the wheel speed at a second time, the second time being subsequent to the first time; and
shifting the transmission gear back to the drive position based on whether the parameter exceeds a second predetermined threshold at the second time.

6. The method of claim 5, wherein the vehicle includes a brake unit, and the method further comprises the step of:
reducing a rate of application of a braking pressure provided to the brake unit based on whether the parameter exceeds the predetermined threshold.

7. The method of claim 5, further comprising the step of:
calculating a vehicle speed of the vehicle;
wherein:
the step of calculating the parameter comprises the step of calculating a wheel slip of the wheel using the wheel speed and the vehicle speed; and
the step of shifting the transmission gear from the drive position to the neutral position comprises the step of shifting the transmission gear from the drive position to the neutral position if the wheel slip exceeds the predetermined threshold.

8. The method of claim 5, wherein:
the step of calculating the parameter comprises the step of calculating a wheel acceleration magnitude and a wheel acceleration frequency of the wheel using the wheel speed; and
the step of shifting the transmission gear from the drive position to the neutral position comprises the step of shifting the transmission gear from the drive position to the neutral position if the wheel acceleration frequency is less than a predetermined wheel acceleration frequency threshold and the wheel acceleration magnitude is greater than a predetermined wheel acceleration magnitude threshold.

9. The method of claim 5, wherein the vehicle includes a brake pedal, and the method further comprises the steps of:
detecting an application of the brake pedal; wherein:
the step of calculating the parameter comprises the steps of:
calculating an intended amount of braking torque using the application of the brake pedal; and
calculating a roughness of a surface on which the vehicle is travelling using the wheel speed; and
the step of shifting the transmission gear from the drive position to the neutral position comprises the step of shifting the transmission gear from the drive position to the neutral position based on whether a combined measure of the intended amount of braking torque and the roughness of the surface exceeds the predetermined threshold.

10. The method of claim 9, wherein the vehicle further includes an additional plurality of wheels, and the step of calculating the roughness of the surface comprises the steps of:
calculating wheel acceleration values for the wheel and the additional plurality of wheels;
calculating a measure of noise in the wheel acceleration values; and
calculating the roughness of the surface using the measure of noise in the wheel acceleration values.

11. The method of claim 10, further comprising the step of:
calculating additional wheel speed values for the additional plurality of wheels;
wherein the step of calculating the wheel acceleration values comprises the step of calculating the wheel acceleration values using the wheel speed and the additional wheel speed values.

12. A system for controlling a vehicle during braking of the vehicle, the vehicle having a wheel and having a transmission gear movable between at least a drive position and a neutral position, the system comprising:
a wheel speed sensor configured to measure a wheel speed of the wheel; and
a controller coupled to the wheel speed sensor and configured to:
calculate a parameter using the wheel speed at a first time, the parameter being indicative of a load on a component of the vehicle;
shift the transmission gear from the drive position to the neutral position based on whether the parameter exceeds a predetermined threshold; calculate the parameter using the wheel speed at a second time, the second time being subsequent to the first time; and
shift the transmission gear back to the drive position based on whether the parameter exceeds a second predetermined threshold at the second time.

13. The system of claim 12, wherein the vehicle includes a brake unit, and the controller is further configured to reduce a rate of application of a braking pressure provided to the brake unit based on whether the parameter exceeds the predetermined threshold.

14. The system of claim 13, wherein the controller is further configured to:
determine whether the vehicle is in a panic braking event; and
reduce the rate of application of the braking pressure provided to the brake unit only on a further condition that the vehicle is not in the panic braking event.

15. The system of claim 12, wherein the controller is further configured to:
calculate a vehicle speed of the vehicle;
calculate a wheel slip of the wheel using the wheel speed and the vehicle speed; and
shift the transmission gear from the drive position to the neutral position if the wheel slip exceeds the predetermined threshold.

16. The system of claim 12, wherein the controller is further configured to:
calculate a wheel acceleration of the wheel using the wheel speed; and shift the transmission gear from the drive position to the neutral position if the wheel acceleration magnitude exceeds the predetermined threshold.

17. The system of claim 12, wherein the vehicle includes a brake pedal, and the system further comprises:
   a brake pedal sensor configured to detect an application of the brake pedal;
   wherein the controller is further configured to:
      calculate an intended amount of braking torque using the application of the brake pedal; and
      calculate a roughness of a surface on which the vehicle is travelling using the wheel speed; and
      shift the transmission gear from the drive position to the neutral position based on whether a combined measure of the intended amount of braking torque and the roughness of the surface exceeds the predetermined threshold.

18. The system of claim 17, wherein the vehicle further includes an additional plurality of wheels, and the controller is further configured to:
   calculate wheel acceleration values for the wheel and the additional plurality of wheels;
   calculate a measure of noise in the wheel acceleration values; and
   calculate the roughness of the surface using the measure of noise in the wheel acceleration values.

19. The system of claim 18, wherein the controller is further configured to:
   calculate additional wheel speed values for the additional plurality of wheels; and
   calculate the wheel acceleration values using the wheel speed and the additional wheel speed values.

* * * * *